Jan. 15, 1963    E. MÜLLER    3,073,611
MEANS FOR ELONGATING WORKPIECES
Original Filed Nov. 19, 1958    2 Sheets-Sheet 1

INVENTOR
ERNST MÜLLER
BY [signature]
AGT.

Jan. 15, 1963          E. MÜLLER          3,073,611
MEANS FOR ELONGATING WORKPIECES
Original Filed Nov. 19, 1958          2 Sheets-Sheet 2
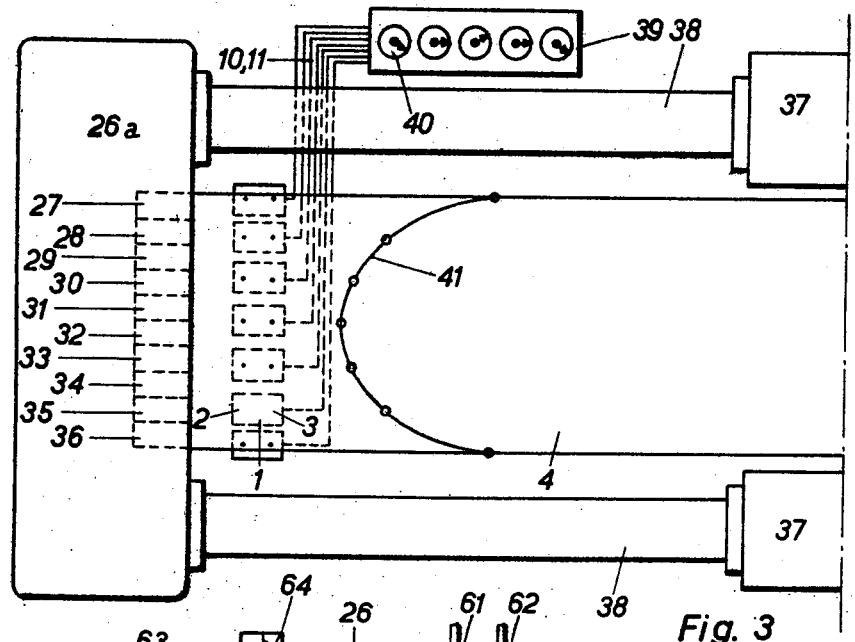
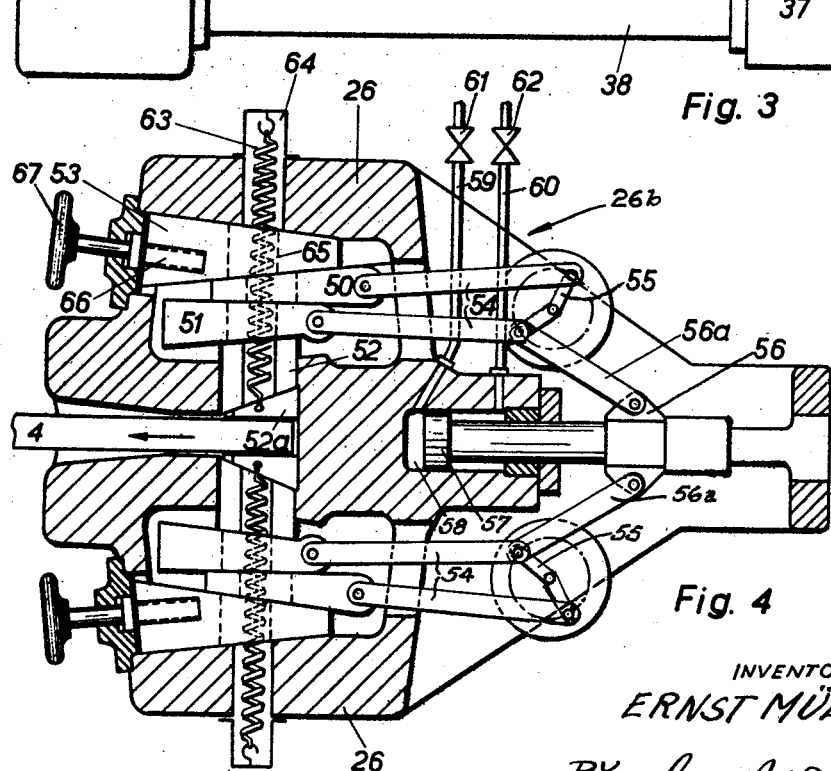
INVENTOR
ERNST MÜLLER

United States Patent Office 3,073,611
Patented Jan. 15, 1963

3,073,611
MEANS FOR ELONGATING WORKPIECES
Ernst Müller, Duisburg, Germany, assignor to
Hydraulik G.m.b.H., Duisburg, Germany
Original application Nov. 19, 1958, Ser. No. 774,907.
Divided and this application Apr. 11, 1960, Ser. No.
21,217
Claims priority, application Germany Nov. 28, 1957
23 Claims. (Cl. 279—4)

The present invention relates to means for stretching or elongating in particular planar members and is a divisional application of the application for patent, Ser. No. 774,907, filed November 19, 1958, for Method and Means for Elongating Workpieces.

The present invention is concerned with the problem of the rupture of workpieces, such as metal sheets and plates, when stretched in a stretching machine.

In such a machine, the workpiece is subjected to tensile stress in order to elongate the workpiece beyond its elastic limit. If the workpiece is ruptured, then large tensile forces are immediately released within the stressed parts of the stretching machine and it is necessary to provide means to absorb these forces. In addition, the rupture of a relatively heavy workpiece always represents a danger both for the machine and its operator.

Therefore, it is an object of the present invention to provide means ensuring the elimination of or a reduction in the dangerous propensities of the prior art stretching machines.

A thorough investigation of the causes of the rupture, unless due to defects in the material, such as shrink holes, has shown that the rupturing of the workpiece is caused by the prior art methods of operating and constructing chucks used in the machines. A chuck assembly for a prior art sheet metal stretching machine has a plurality of chuck elements distributed over several juxtaposed clamping elements, so that each clamping element can adapt itself independently of the others, to an irregularity in the thickness of the workpiece.

Assuming that the reaction forces of the clamping elements are absorbed directly by the frame body of the chucks, it is unavoidable, with large friction forces and a method of operation wherein the stretching process is effected in one operation, that the clamping effect of the indirect clamping elements diminishes. This is due to the fact that the frame body of the chuck is bent up by the friction forces with the result that the supporting surfaces of the clamping elements yield.

Consequently, it follows that the marginal or outer edge areas of a plate that is being stretched will be extended to a greater degree than the central areas. This also explains the reason for the plates usually breaking in the region of the chuck, because the irregular stress and strain distribution is most pronounced in said region. Even if a plate is not ruptured when stretched to the desired extent, the prior art method and apparatus results in a greater degree of stretching along the longitudinal edges than in the center of the plate.

Therefore, it is another object of the present invention to provide means affording the prevention of the irregular or uneven stretching of the workpiece.

Another object of the present invention is to provide means facilitating the stretching of workpieces by eliminating the rupture thereof especially in the region of the chuck.

Another object of the present invention is the provision of means contriving an apparatus for stretching planar workpieces which utilizes a chuck of the described type and which assures the prevention of an irregularly distributed extension over the width of or across the workpiece.

A further object of the present invention is the provision of means achieving a highly novel and efficient chuck assembly wherein the clamping elements can be controlled independently of each other so as to assure that the initiation of the full clamping effect of the clamping elements can be varied individually or to provide that the clamping effect diminishes in the individual elements.

These and other objects of the invention will become further apparent from the following detailed description, reference being made to the accompanying drawings showing a preferred embodiment of the invention.

In the drawings which illustrate the best mode presently contemplated of carrying out the invention:

FIG. 3 is a view, in elevation, of a measuring apparatus provided on a stretching machine; and FIG. 4 illustrates, in section, a chuck pursuant to the present invention.

Figure 1:
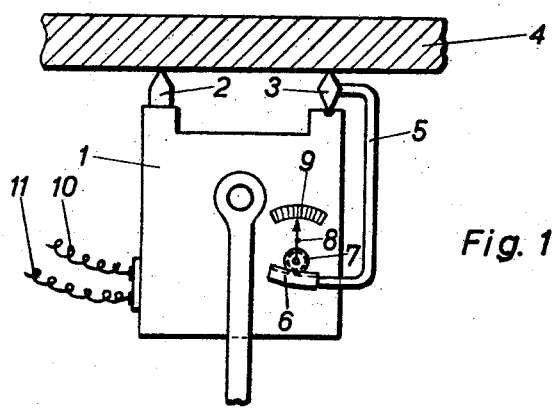
FIG. 1 is a view, in elevation, of an extensometer in operative position.

The present invention is directed to means utilizing a chuck of the previously described type to prevent an irregular elongation or stretching of a workpiece across the widthwise dimension thereof. The solution to the problem, pursuant to the present invention, resides in a method employing two phases in effecting the stretching of planar workpieces.

In the first phase, the extensions in the workpiece are measured at several points along one traverse plane of the workpiece and are compared with each other. In the second phase, a correction or adjustment is effected in the juxtaposed clamping elements in acordance with the various extensions. Those clamping elements, which are associated with the points of greater elongation, that is, which are closest to such points, are loosened or made less effective in the following stretching phase than the clamping elements associated with the points of lesser extension. Consequently, with a relatively low stretching force, there is obtained pronounced varying extension values, measuring the extension in a transverse plane of the workpiece directly ahead of the chuck device. Conventional means, such as extension measuring strips, or other instruments which permit a remote reading of the extension values, can be used to measure the extensions or elongations.

The manner in which the correction of the adjustment is effected at the clamping elements, the necessity for and the changes required in the chuck device, depends on the construction utilized or on the allowable expenditure of apparatus.

If loose wedge jaws are available, if the type which, when brought to the workpiece, penetrate the workpiece during the stretching operation, with toothed clamping faces and produce the clamping force, due to the wedge effect, only when they are carried along, the above-mentioned correction is very simple. Said correction can be effected, without any change in the chuck device, by pushing the clamping jaws back by hand, after an intermittent loosening of the clamping elements, in the vicinity of the plate edges where the elongations are greatest.

Consequently, when the sliding wedge of all the clamping elements are again brought to the workpiece, these clamping jaws will become effective at a point later than that for which they were previously set. Consequently, when the frame body bends up due to the reaction forces of the presently gripping central clamping elements, and these clamping jaws slide down and grip again, only then do the jaws of the outer corrected clamping elements begin to grip. From then on, nothing much can change in the clamping conditions in the course of the second stretching phase. If necessary, the correcting process can be repeated several times.

In order to be able to carry out the chuck corrections without any great loss of time, and to the exactly determined extent, the prior art chuck device must be modified. In such prior art devices, it was customary to drive the individual clamping elements by a common drive. Pursuant to an important feature of the present invention, provision is made for a chuck device wherein the clamping elements can be controlled independently of each other so that the initiation of the full clamping effect of the clamping elements can be varied individually or the clamping effect itself decreased individually.

In the case of clamping elements having swinging or positively displaceable clamping jaws, it is possible to determine for each clamping element the moment of its engagement, and thus its maximum clamping effect, by means of an individual drive, and said drives can be controlled either individually of simultaneously. Under these circumstances, it is necessary to reduce the stretching force to zero, and to loosen the chuck device completely after the elongations have been measured and before the adjustment of the clamping elements is corrected.

In the case of loose clamping jaws, which can be displaced merely by entrainment and which normally abut sliding wedges, it would be possible, in order to reduce the stresses at the edges of the workpiece, to retract the sliding wedges with good lubrication under full or partial stretching load, so that the clamping jaws can slide down a certain amount during the stretching operation before they cause premature elongations of the edges.

The adaptation of the chucking device to the process of the present invention is particularly simple if clamping elements, working with a sliding wedge, about the frame body of the chuck device to permit a variable pre-adjustment of the adjusting elements. If the drives of the adjusting elements, for example, adjusting wedges, are not combined, but the elements are adjustable individually or in pairs, corrections in the sense of a loosening of the clamping elements can be effected under load, without affecting the sliding wedge drive, per se, correction under load or partial load has the advantage that the extent of the stress-strain reduction at the jeopardized edge areas of the workpiece being stretched can be observed during the correction.

Further developments of chuck devices, according to the present invention, are independent of the method of the present invention, since there is no need for a measurement in each stretching process. The differences in the elongations of the width of the workpiece can be determined from experimental values so as to provide a preliminary adjustment of the various clamping elements whereby the action of the outer elements can be delayed in the first stretching phase by a predetermined extension, caused by the immediate gripping of the clamping elements.

Referring now to the drawings in detail, a conventional extensometer 1 is utilized to ascertain the locally distributed extension or elongation of the planar member, plate or workpiece 4. The extensometer has two spaced calipers 2 and 3, caliper 2 being fixed and caliper 3 being pivotally movable. It will be noted that the calipers abut a surface of the workpiece and during extension thereof, caliper 3 is displaced relative to caliper 2. This motion is transmitted via lever 5, on one end of which caliper 3 is mounted, to a ratchet gear 6, at the other end of the lever. Gear 6 is meshed with pinion gear 7 provided with a pointer or index 8 which is moved along a scale 9 which indicates measured displacement values. The pinion gear 7 can also operate the shaft of a rotary potentiometer so that a measured voltage value responsive to the relative displacement of caliper 3, can be transmitted over the wires 10—11 for indication at a remote location.

Pursuant to the present invention, extensometers 1 are raised upwardly to the workpiece 4 by lifting devices generally indicated by the reference numeral 100. Device 100 comprises a lifting rod 12, from which an extensometer is suspended in stable position. The rod 12 is articulated on a bifurcated member 13 and can swing thereon, in the stretching plane of the workpiece, against the pressure of spring 14. An extensometer must have this freedom of movement to follow the extension of the workpiece without damage to the points of calipers 2 and 3. The bifurcated member 13 is carried by two governors 15—16 which are supported in bearing blocks 17—18. The dual governor system is so designed that the member 13 can be moved with the extensometer 1 toward or away from the workpiece, as shown in the full and broken line positions thereof in FIG. 2.

In order to effect the raising and lowering of the extensometer, provision is made for a driven rack 19 which drives a pinion gear 20 keyed to the bearing shaft 25 of the governor 16. The rack 19 is the rod of a piston 21 which is reciprocable in a cylinder 22 in response to a pressurized fluid introduced into the cylinder at either of the inlet valves 23 or 24.

If each raising device 100 has an individual drive each device can adapt itself to the irregularities in the workpiece surface. However, it is within the scope of the present invention to provide a common rack and pinion drive for all adjacent raising devices by means of a common shaft 25. Where this is done, the governors 15 and 16 are constituted by bendable springs. Despite surface irregularities in the workpiece, with a common lifting device all extensometers 1 can be brought into operative position in abutment with the workpiece. Due to the pendulum-like suspension of the extensometers by means of their associated rods 12, the extensometers can adapt to a possible inclination of the workpiece from its horizontal disposition, for example where the workpiece sags under the tensile stress thereof. As a result, the extensometers are always parallel to the undersurface of the workpiece.

By having the extensometers raised to the workpiece from a position therebelow, the space above the workpiece is free and the sensitive measuring instruments, normally positioned thereabove, cannot be damaged when a workpiece is inserted into the apparatus. In the embodiment illustrated in FIGS. 1 and 2, the lifting mechanism 100 is mounted on the frame body 26 of a chuck 26a so that the measurements can be made in the direct area of the point of support, even if the chuck traverse is adjustable.

FIG. 3 illustrates a portion of a sheet-stretching machine 101 and shows the arrangement of the complete measuring mechanism on the machine. The device 26a is a movable chuck in which the plate 4 is clamped by means of a plurality of clamping elements indicated by the reference numerals 27 through 36.

The stretching force is produced in cylinders 37 and is transmitted by the pressure posts 38 to the movable chuck 26a which extends transversely thereof.

As shown in FIG. 3, seven extensometers 1, each provided with the calipers 2—3, are lifted by mechanisms 100 (FIG. 2), from a position below the plate 4 to abut the lower surface thereof, being arranged in a plane transversely of the plate. The measurements, determined by the movement of each caliper 3 relative to its associated caliper 2, are transmitted as voltages, as previously described, over wires 10—11 to a panel 39 provided with meters or indicators 40 which visually show the extent of each measurement.

Since the clamping elements 27–36 directly abut the frame body 26 of the chuck, the frame body will bend slightly in the center thereof during the stretching operation. Consequently, the central clamping elements, for example 30 to 33, will be displaced so as to partially loosen their clamping action whereby the plate 4 will be stretched to a greater extent along its opposite longitudinal edges 102 and 103 than in its central region 105.

Said variation in the extent of elongation of plate 4 is measured by the extensometers 1 and may be read on the meter 40. The curve 41 illustrates the course of the elongation over the widthwise dimension of the plate. The variation in the elongation of the plate, considering its widthwise dimension, create internal stresses in the workpiece which can be sufficient to rupture the workpiece. In order to avoid this, the determination of the course of the elongation measurements over the widthwise dimension of the workpiece, pursuant to the present invention, is utilized to correct the conditions at chuck 26a in order to obtain a uniform course of extension measurements or values. For this purpose, the stretching process is halted and correction is made in various ways, depending on the construction of the chuck.

Figure 2:
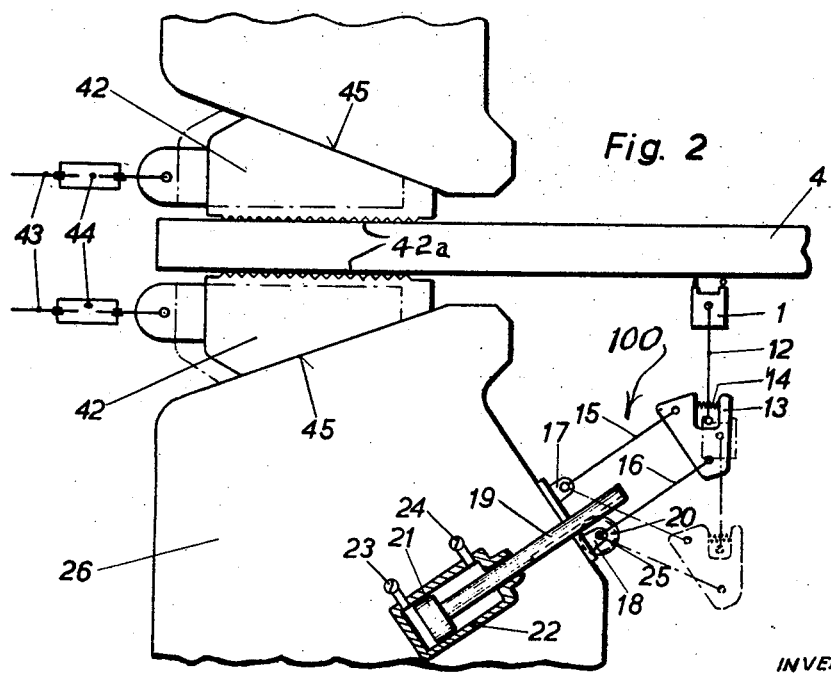
FIG. 2 is a view, in elevation, of a device for supporting an extensometer and raising it to a planar workpiece which is to be stretched with a chuck device.

In the case of chuck provided with conventional clamping elements constituted by a pair of wedged jaws 42, as shown in FIG. 2, which jaws can be moved only simultaneously and positively over pull rods 43 by a common drive, the length of the lever system of each individual wedged jaw and pair of wedged jaws, respectively, is made variable, pursuant to the present invention, by inserting a turnbuckle 44 in each rod 43. A scale can be provided for each turnbuckle 44 to determine the longitudinal variations in the rod.

A uniform elongation of the plate 4 can be achieved with a chuck 26 in the following manner:

After the course of the elongation has been determined or plotted by means of the mechanisms illustrated in FIGS. 1–3, or the course is predetermined on the basis of experimental values, the machine 101 is unloaded and the wedged jaws 42 are loosened. The turnbuckles 44 for those clamping elements, which are to operate at maximum after such operation of the remaining clamping elements, are actuated. The simplest way to effect this correction is to retract the wedged jaws of the outermost clamping elements 27–29 at edge 103 and 34–36 at edge 102, since their lever systems 43 are shortened by their turnbuckles 44.

When all the clamping elements have been displaced uniformly by their common drive, the central clamping elements move into operative position, as shown in full line in FIG. 2, while the outer clamping elements do not grip the plate 4, as shown in broken line in said figure. If the plate is now stretched, or the stretching is resumed, the jaws 42 of the central clamping elements 30–33 are carried along the stretching direction due to the wedge effect and thus obtain their maximum clamping effect.

The frame body 26 bends up, and the jaws slide down along their abutment surfaces 45. Due to the intercoupling of all clamping elements, the trailing jaws of the outer clamping elements follow this motion so that they now also grip. The upward bending of the frame body 26 may increase slightly or not at all, since it has already been considerably bent upwardly prior to the concentration of the entire clamping force.

The central clamping elements which were first to grip, and the bending are relieved by the action of the outer clamping elements with regard to the bending stress. Because of the restraint of the jaws of the central clamping elements, the frame cannot spring back, so that a form of residual stress remains which is eliminated when the full stretching force is applied.

The embodiment of the chuck illustrated in FIG. 2 differs from prior art devices by the use of the turnbuckles 44 which make it possible, with a coupled and positive drive of all the wedged jaws, to vary the initiation of the full clamping effect of the clamping elements. In lieu of the wedged jaws 42, there can be provided conventional swinging jaws whose full clamping force is also produced only under full stretching load.

Since a separate electric drive for each turnbuckle 44, for rapid operation thereof, may offer difficulties in construction, it is preferable to provide the chuck 26, illustrated in FIG. 2, with a common drive for all the clamping elements, in order to obtain desired pre-adjustments pursuant to the present invention. As previously indicated, this correction cannot be effected under load because of the engagement of the workpiece 4 by the toothed or serrated surface 42a of the wedged jaw 42.

Referring now to FIG. 4 in detail, there is shown another embodiment of a chuck, pursuant to the present invention. The chuck 26b comprises a uniform cast steel body 26 which houses all clamping elements, namely, those engaging the workpiece 4, both from the top and the bottom thereof.

In the present embodiment, a clamping element comprises two pairs of oppositely moving sliding wedges 50 and 51, one perpendicular pressure piece 52, a separately moving wedge end 52a for each pair, and an adjusting wedge 53, for each pair, serving as an abutment. The two sliding wedges 50—51 are connected by push rods 54 with a crank 55. The crank is driven by a toggle lever 56 by means of a push rod 56a. The toggle lever is guided for rectilinear movement and operated hydraulically by means of a cylinder 58 and piston 57. Conduit 59 is a water pressure supply line for the cylinder and conduit 60 is a discharge line therefor, valves 61 and 62 being provided in said lines respectively.

All the moving parts 50, 51 and 52 in the chuck are subjected to the tensile force of a spring 63. One end of the spring is secured to the wedge piece 52a and the other end to a hood 64 mounted on the body 26. Each spring 63 passes through the body 26 and the associated adjusting wedge 53, sliding wedges 50—51 and pressure piece 52. In view of the relative motion of the sliding wedges and the adjusting wedge relative to the spring 63, oblong apertures 65 have to be provided in these parts.

The chuck 26b operates as follows:

In the starting position, shown in FIG. 4, all moving parts are retracted by the force of the springs 63. The sliding wedges are also in starting position, corresponding to the largest jaw opening. When a pressurized fluid is applied to piston 57, through conduit 59, toggle lever 56 moves to the right, viewing FIG. 4, so that the wedges 50 move is the opposite direction through the median of the links 56a, the cranks 55 and the rods 54.

The pressure members 52a are, as a result, moved perpendicular to the clamped end of the plate 4, and abut the latter. When the plate 4 is subjected to tensile stress, the wedged pressure members 52a automatically readjust and exert an additional clamping force in proportion to the tensile stress.

When, due to the large reaction forces which is must absorb, the cast steel body 26 bends up in its central area in the course of the stretching process, all moving parts 50, 51, 52 and 53 yield so that the wedges 52a can slide down in the direction of the stretching action.

The amount of the extension of plate 4 is reduced by the amount which the wedges 52a can yield in the stretch direction, with regard to the portions of the plate associated with clamping elements whose clamping effect is not affected as much by the upward flexing of the body 26. The simplest way to correct the chuck in order to obtain a uniform distribution of the extension of the workpiece is by means of the adjusting wedges 53 which permit the chuck to be readily adjusted for various plate thicknesses. Each adjusting wedge has its own adjusting mechanism comprising a spindle 66 and a handwheel 67. Consequently, the adjusting wedges of the outer clamping elements 27–29 and 34–36 (FIG. 3) can be separately retracted to permit the associated wedge members 52a thereof to slide down. In this manner, excessive elongation of the plate at its edges is eliminated and the edge elongations are adapted to the extent of elongation in the central area of the plate.

This process can be effected under load with an appropriate construction of the adjusting drive for the adjusting wedges. In this correcting procedure, one of the valves 61—62 must be closed so that the retracting motion of the adjusting wedges of a clamping element is not cancelled again by a readjustment of the sliding wedges 50—51.

The previously described method for obtaining correction does not require a separate, individually controllable motive drive for each clamping element. The pressure-fluid conduits 59—60 can be common to all the clamping elements so that only one valve 61 and one valve 62 need be provided since, in the retraction of the adjusting wedges in the individual clamping elements, the motive drive for all the other clamping elements can be blocked by closing either valve 61 or valve 62.

In chucks which are similar to chuck 26b but are not provided with the adjusting wedges 53, it is necessary, when correcting a chuck, for each clamping element to be individually controllable. Each cylinder must have a supply conduit 59 and a discharge conduit 60, each with its valves 61 and 62. If it is assumed that the adjusting wedges are part of the cast steel body 26, a chuck correction can be made as follows:

Theoretically, it would be possible to displace the sliding wedges 50, 51, at the outer clamping elements under load, by their individual motive drives in such a manner that the clamping effect is loosened and the wedge pieces 53a slide down. But, using a hydraulic drive, the exact degree of this adjusting motion cannot be determined.

The passage of the coefficient of friction between the sliding wedges and their abutment surfaces, from rest to motion, is an uncertain factor which is unimportant in the spindle drive of the adjusting wedges. It is preferable, therefore, to forego this type of correction.

The situation is different if the stretching process is halted, the stretching force reduced and the chucks loosened. Consequently, before the second stretching phase, there can be produced a varying pre-adjustment of the sliding wedges, and consequently, a varying pre-adjustment of different times of operation of the wedges 52a by the individual motion drive for each clamping element, so that the central clamping elements 30–33 (FIG. 3) grip first during a continuous stretching operation, and the wedged jaws of the outer clamping elements 27–29 and 34–36 grip at a later time, after the sliding wedges have advanced together after the pre-adjustment.

It is within the scope of the present invention to make all the operations automatic, to a great extent, such as the measurement and correction of the chucks. For example, each of the spindles 66 of the adjustment wedges 33 can be driven by a motor and the motors can be directly controlled by increased readings at the meters 40 (FIG. 3) or measuring devices 8—9 (FIG. 1).

It is possible also to estimate the course of the measurements during the stretching operation, without taking actual measurements, and to obtain the desired result with a chuck where the lever systems 43 of the clamping elements 42 (FIG. 2) have an increasing length from the inner to the outer clamping elements, from the beginning of the operation and without any variations provided.

A prerequisite for this method is a synchronous coupling and a common drive for all the clamping elements. Although this is a somewhat inaccurate way of equalizing different elongations in sheets to be stretched (because of the estimate of the course of extension), it is nevertheless a promising method, particularly for stretching machines which are seldom or never changed for other workpiece dimensions.

Consequently, it will be apparent that the basic concept of the present invention resides in a chuck with delayed action of the clamping elements toward the unyieldingly supported clamping elements.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A chuck assembly for a stretching machine comprising chuck means having a movable frame provided with a plurality of separate juxtaposed clamping elements, said clamping elements being mounted by said chuck means for gripping articles for the direct absorption of the reaction forces directly by movement of said frame, and means for individually controlling at least one of said clamping elements, to vary the initiation of the full clamping effect of said clamping elements upon movement of said frame.

2. A chuck assembly as defined in claim 1, further characterized in that the clamping elements are synchronously coupled and provided with a common drive.

3. A chuck assembly as defined in claim 2, further characterized in that the drive comprises variable length lever means.

4. A chuck assembly as set forth in claim 3, further characterized in that said lever means has a variably increasing length from the inner to the outer clamping elements.

5. A chuck assembly as defined in claim 2, further characterized in that the drive comprises variable length lever means provided with turnbuckles to effect said variation.

6. A chuck assembly as set forth in claim 1, further characterized in that the clamping elements are provided with slidable wedges which abut adjusting elements provided on the frame to provide a variable pre-adjustment of the clamping elements.

7. A chuck assembly as set forth in claim 6, further characterized in that the adjusting elements comprise adjusting wedges, and means to adjust said wedges individually.

8. A chuck assembly as set forth in claim 6, further characterized in that the adjusting elements comprise adjusting wedges, and means to adjust said wedges in pairs.

9. A chuck assembly as defined in claim 1, further characterized in that each clamping element has swinging clamping jaws and motive means for said jaws controllable selectively individually and in common.

10. A chuck assembly as defined in claim 1, further characterized in that each clamping element has sliding wedges and motive means for said wedges controllable selectively individually and in common.

11. A clamping chuck for a stretching machine comprising a pair of clamping jaws for gripping an object having opposed gripping surfaces, a movable wedging element engageable, upon relative movement in respect to said jaws, with at least one of said jaws to displace said jaw into gripping engagement with articles disposed between it and the opposite jaw, means to move said movable wedging element, and means to adjust the relative position of said wedging element and the jaw connected thereby independently of said moving means.

12. A clamping chuck according to claim 11, including a wedging element on each side of said clamping jaws engageable with said clamping jaws for displacing said clamping jaws into clamping engagement, said adjustment means including a displaceable wedge member engageable with each of said movable wedging elements to shift the position of said wedging elements in relation to said clamping jaws.

13. A clamping chuck according to claim 12, including hand control means for adjusting said displaceable wedge member.

14. A clamping chuck according to claim 12, including at least two separate displaceable wedge members being relatively slidably engaged.

15. A clamping chuck according to claim 11, wherein said movable wedging element and the associated jaw include inclined cooperative faces.

16. A clamping chuck according to claim 11, wherein said means to move said movable wedging element and to adjust the relative position thereof includes turnbuckle means.

17. A clamping chuck according to claim 11, wherein at least one of said jaws includes an inclined face cooperative with a similar inclined face of said movable wedging element, said means to adjust the relative position of said jaw and said wedging element including means to displace said jaw to vary the location at which it is contacted by said movable wedging element.

18. A clamping chuck according to claim 11, wherein said means to adjust the relative position of said jaw and said wedging element includes a displaceable wedge member bearing on said wedging element and being displaceable to shift the position of said wedging element relative to the associated jaw.

19. A clamping chuck for a stretching machine comprising a pair of opposed clamping jaws for gripping an object, each of said jaws having inclined outer faces, a wedge element having a complementary inclined face in engagement with the outer faces of each of said clamping jaws, means to displace said wedge element to cause moving together of said jaws for clamping purposes, and means for adjusting the relative position of said wedge member and the associated clamping jaw independently of said means for moving said wedge member to vary the time at which said clamping jaws are moved together for clamping engagement.

20. A clamping chuck according to claim 19, wherein said means to adjust the relative position of said wedging element and the associated clamping jaws includes a displacement wedge.

21. A clamping chuck for a stretching machine comprising a housing having an opening at one end to receive material to be gripped, a pair of opposed clamping jaws located in said opening for gripping an object placed therein, said clamping jaws having opposite inclined faces, said housing having a passage defined therein in a direction extending outwardly from each of said clamping jaw inclined faces, a wedging element in each of said passages each having an inclined face in engagement with an associated inclined face of a clamping jaw, means to bias said wedging elements against the associated clamping jaws, wedging means for adjusting the relative position of said wedging element in respect to the associated clamping jaw, and means to displace said wedging element in said passages relatively to said clamping jaws to effect gripping engagement of an article by said jaws.

22. A clamping chuck according to claim 21, wherein said means to displace said wedging element includes at least one sliding wedge and means to displace said wedge substantially perpendicularly to said passage.

23. A clamping element according to claim 22, including at least two relatively slidable wedges, said means to displace said wedges including fluid operated pressure means.

References Cited in the file of this patent

UNITED STATES PATENTS

| | | |
|---|---|---|
| Re 23,843 | Moore | June 29, 1954 |
| 2,218,503 | Brook | Oct. 22, 1940 |